(12) United States Patent
Lee et al.

(10) Patent No.: US 9,800,547 B2
(45) Date of Patent: Oct. 24, 2017

(54) PREVENTING NETWORK ATTACKS ON BASEBOARD MANAGEMENT CONTROLLERS

(71) Applicant: INTERNATIONAL BUSINESS MACHINES CORPORATION, Armonk, NY (US)

(72) Inventors: Cheng-ta Lee, Taipei (TW); Sheng Hao Wang, Taipei (TW); Kaifu Wu, Taipei (TW); Rick M F Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 14/688,196

(22) Filed: Apr. 16, 2015

(65) Prior Publication Data

US 2016/0308828 A1    Oct. 20, 2016

(51) Int. Cl.
*H04L 29/06*    (2006.01)
*H04L 12/707*   (2013.01)

(52) U.S. Cl.
CPC ...... *H04L 63/0209* (2013.01); *H04L 63/0245* (2013.01); *H04L 63/1425* (2013.01); *H04L 63/1441* (2013.01); *H04L 63/20* (2013.01); *H04L 45/22* (2013.01)

(58) Field of Classification Search
CPC . H04L 63/1416; H04L 45/22; H04L 63/1441; H04L 63/0209; H04L 63/0245
USPC .......................... 726/13, 23; 706/47; 709/224
See application file for complete search history.

(56) References Cited

U.S. PATENT DOCUMENTS

| | | | | |
|---|---|---|---|---|
| 7,320,143 B2* | 1/2008 | Le Pennec | .......... | H04L 63/1466 709/225 |
| 7,992,206 B1* | 8/2011 | Painter | .................. | G06F 21/567 713/154 |
| 8,312,533 B2* | 11/2012 | Price | ....................... | G06F 21/85 370/238 |
| 8,417,774 B2 | 4/2013 | Flynn et al. | | |
| 8,713,666 B2 | 4/2014 | Motil et al. | | |
| 8,732,829 B2 | 5/2014 | Johnson et al. | | |
| (Continued) | | | | |

FOREIGN PATENT DOCUMENTS

TW          I380167 B      12/2012

OTHER PUBLICATIONS

IBM, Appendix P, List of IBM Patents or Patent Applications Treated as Related, dated May 9, 2017, 2 pages.

*Primary Examiner* — Abu Sholeman
(74) *Attorney, Agent, or Firm* — William H. Hartwell

(57) ABSTRACT

A method for preventing network attacks on baseboard management controllers. The method includes receiving, by the network controller, a packet from a computer networking device on a computer network, where the packet is destined for a baseboard management controller (BMC); determining, by the network controller, whether the packet contains a tag identifying that the packet has been determined to be free of suspicious or malicious traffic; on condition that the packet has been determined to not contain the tag, sending the packet to a network inspection module, by the network controller, to be inspected for suspicious or malicious traffic; and on condition that the packet has been determined to contain the tag, sending the packet to the BMC by the network controller using a side band interface.

6 Claims, 8 Drawing Sheets

(56) References Cited

U.S. PATENT DOCUMENTS

| | | | |
|---|---|---|---|
| 2003/0177381 A1* | 9/2003 | Ofek | H04L 47/10 726/14 |
| 2008/0127335 A1* | 5/2008 | Khan | H04L 63/00 726/22 |
| 2009/0106401 A1* | 4/2009 | Meng | H04L 29/12424 709/220 |
| 2010/0088763 A1* | 4/2010 | Yoo | H04L 63/1458 726/22 |
| 2011/0075667 A1* | 3/2011 | Li | H04L 12/4633 370/392 |
| 2011/0099631 A1* | 4/2011 | Willebeek-LeMair | H04L 43/028 726/23 |
| 2014/0165183 A1* | 6/2014 | Dharmadhikari | H04L 63/0227 726/13 |
| 2015/0326528 A1* | 11/2015 | Murthy | H04L 63/20 726/1 |
| 2016/0308886 A1 | 10/2016 | Lee et al. | |

* cited by examiner

PREVENTING NETWORK ATTACKS ON BASEBOARD MANAGEMENT CONTROLLERS

BACKGROUND

The present invention relates generally to the field of network security, and more particularly to an intrusion detection system for service processors.

An intrusion detection system (IDS) is a device or software application that monitors network or system activities for malicious activities or policy violations and produces reports to a management station. IDSes may detect suspicious traffic in many different ways, and may be network-based and/or host-based. Intrusion detection systems that also attempt to stop intrusion attempts (in addition to detecting them) are called intrusion detection and prevention systems (IDPS). IDPSes are generally focused on identifying possible incidents, logging information about them, and reporting intrusion attempts. Organizations may also use IDPSes for other purposes, such as identifying problems with security policies, documenting existing threats, and deterring individuals from violating security policies.

A baseboard management controller (BMC) is a specialized microcontroller embedded on the motherboard of an appliance or computer, generally a server. The BMC manages the interface between system management software and platform hardware. Different types of sensors built into the computer system report to the BMC on parameters such as temperature, cooling fan speeds, power status, operating system (OS) status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling to reinstate operational capabilities of the system.

U.S. Pat. No. 8,732,829 B2 discloses a system and method for monitoring and securing a baseboard management controller. As indicated in the Abstract, "the method includes coupling to a baseboard management controller of a computer system via a console port, maintaining a persistent connection to the baseboard management controller, monitoring data from the console port, determining from the data whether an unauthorized access has occurred, and sending an alert if the unauthorized access has occurred."

In today's networking environments, a BMC may present a significant security exposure because administrators are likely to overlook the fact that a BMC is connected to the network. The computing power and memory of a BMC is typically very limited, which makes deploying a network security module (e.g., a packet inspection module) in the BMC not practical. As such, prior art computer systems do not protect against network intrusions, denial of service attacks, or spoofing attacks. Furthermore, most network security software available today is x86 based, which makes porting the network security software to a BMC a difficult task due to the architecture of the BMC.

SUMMARY

In one embodiment, a method for preventing network attacks on baseboard management controllers includes a network controller receiving a packet from a computer networking device on a computer network, where the packet is destined for a baseboard management controller (BMC). The network controller then determines whether the packet contains a tag identifying that the packet has been determined to be free of suspicious or malicious traffic. On condition that the packet has been determined to not contain the tag, the network controller then sends the packet to a network inspection module to be inspected for suspicious or malicious traffic. On condition that the packet has been determined to contain the tag, the network controller then sends the packet to the BMC using a side band interface. One advantage of this embodiment, for example, is that a host system may directly protect its controlling BMC, preventing malicious traffic from reaching the BMC.

Some embodiments of the present invention optionally include, upon sending the packet to the network inspection module, determining whether a local host is available. An advantage of these embodiments, for example, is that the computer processing unit and memory of the BMC are not burdened with network packet inspection.

Some embodiments of the present invention optionally include, upon determining that the local host is available, sending the packet to the local host residing on the same server as the network controller, wherein the local host includes the network inspection module. An advantage of these embodiments, for example, is that the network inspection module residing on the local host can additionally inspect network packets for other devices in the network environment.

Some embodiments of the present invention optionally include, upon determining that the local host is not available, sending the packet to a remote host residing on a different server than the network controller, wherein the remote host includes the network inspection module. One advantage of these embodiments, for example, is that the network inspection module residing on the remote host can additionally inspect network packets for other devices in the network environment, including additional BMCs.

In another embodiment, a computer program product for preventing network attacks on baseboard management controllers includes a network controller receiving a packet from a computer networking device on a computer network, where the packet is destined for a baseboard management controller (BMC). The network controller then determines whether the packet contains a tag identifying that the packet has been determined to be free of suspicious or malicious traffic. On condition that the packet has been determined to not contain the tag, the network controller then sends the packet to a network inspection module to be inspected for suspicious or malicious traffic. On condition that the packet has been determined to contain the tag, the network controller then sends the packet to the BMC using a side band interface. One advantage of this embodiment, for example, is that a host system may directly protect its controlling BMC, preventing malicious traffic from reaching the BMC.

In another embodiment, a computer system for preventing network attacks on baseboard management controllers includes a network controller receiving a packet from a computer networking device on a computer network, where the packet is destined for a baseboard management controller (BMC). The network controller then determines whether the packet contains a tag identifying that the packet has been determined to be free of suspicious or malicious traffic. On condition that the packet has been determined to not contain the tag, the network controller then sends the packet to a network inspection module to be inspected for suspicious or malicious traffic. On condition that the packet has been determined to contain the tag, the network controller then sends the packet to the BMC using a side band interface. One advantage of this embodiment, for example, is that a host system may directly protect its controlling BMC, preventing malicious traffic from reaching the BMC.

DETAILED DESCRIPTION

Embodiments in accordance with the present invention recognize significant advantages of preventing network attacks on baseboard management controllers (BMC), utilize an intrusion protection system to block unwanted or harmful traffic, and provide a filter tag logic to quickly route received packets to the BMC. Embodiments described herein may be used by any servers and/or appliances that provide management and monitoring capabilities independently of the processor(s) of the host system. Embodiments described herein solve BMC security issues that many information technology (IT) administrators may not be aware of.

Figure 1:
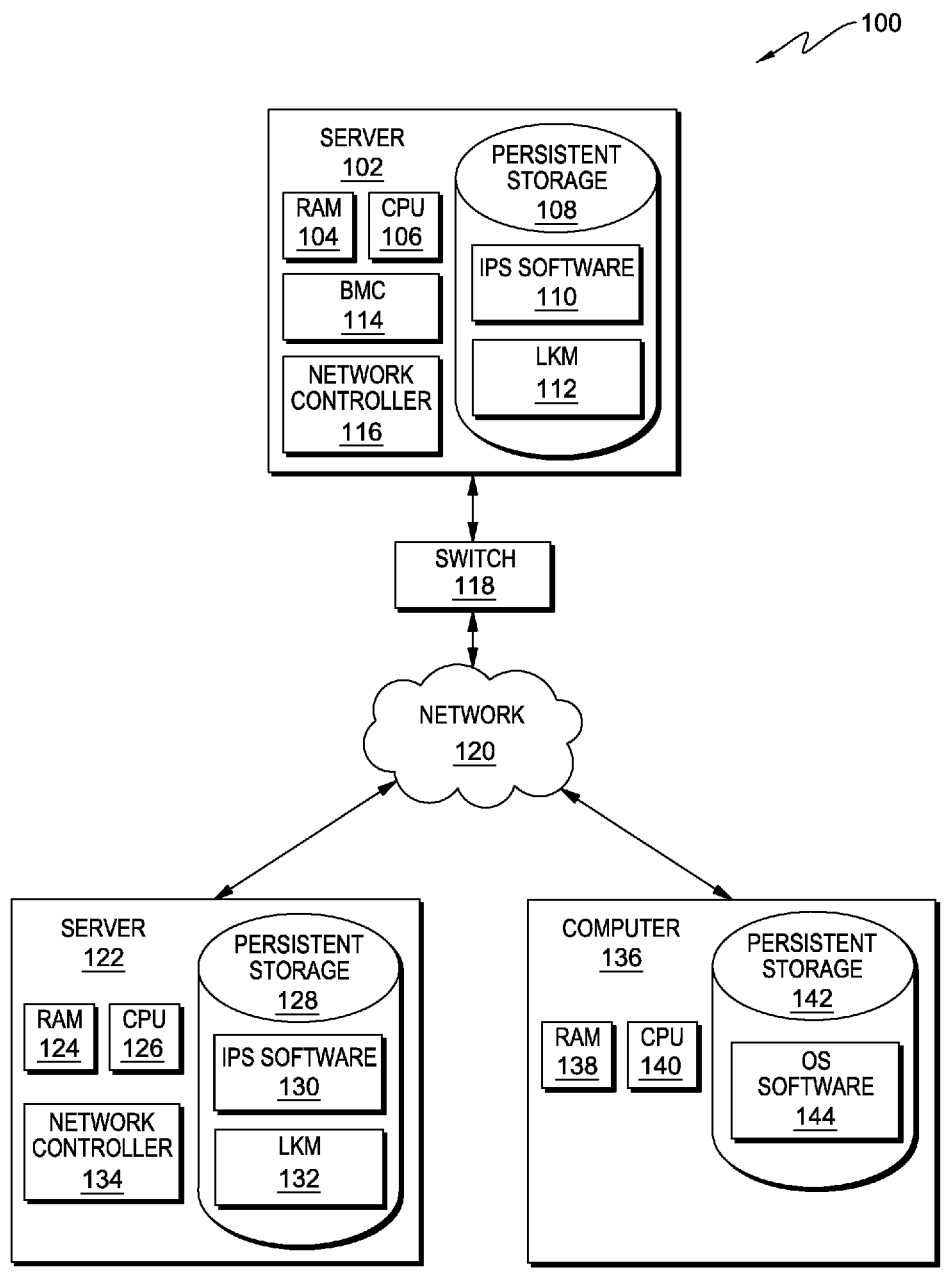
FIG. 1 is a functional block diagram illustrating a distributed data processing environment, in an embodiment in accordance with the present invention.

Embodiments in accordance with the present invention will now be described in detail with reference to the Figures. FIG. 1 is a functional block diagram illustrating a distributed data processing environment, generally designated 100, in an embodiment in accordance with the present invention.

Distributed data processing environment 100 includes server 102, switch 118, server 122, and computer 136, all interconnected over network 120. Server 102 includes RAM 104, central processing unit 106, persistent storage 108, baseboard management controller 114, and network controller 116. In one embodiment, server 102 may be computer system incorporating a BMC for IT administrative uses such as powering on or off partitions. In another embodiment, server 102 may be a computer appliance incorporating an integrated BMC or similar system service processor for setup and configuration of the computer appliance. In some embodiments, server 102 is referred to as the "local host" and server 122 is referred to as the "remote host."

Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 120. In other embodiments, server 102 may represent server computing systems utilizing multiple computers as a server system, such as in a distributed computing environment. In general, server 102 is representative of any electronic devices or combinations of electronic devices capable of executing machine-readable program instructions and communicating with switch 118, server 122, and computer 136 via network 120 and with various components and devices within distributed data processing environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Intrusion protection system (IPS) software 110 and loadable kernel module (LKM) 112 are stored in persistent storage 108, which also includes operating system software, as well as, software that enables server 102 to communicate with switch 118, server 122, and computer 136 over a data connection on network 120. IPS software 110 (sometimes also referred to as a "network inspection module") executes on server 102 during runtime and monitors traffic to BMC 114 and sever 102 from all devices on network 120. In one embodiment, IPS software 110 analyzes the incoming packets to prevent hacking or denial of service attacks on BMC 114 and/or server 102. In other embodiments, IPS software 110 may perform an analysis of passing traffic on the entire subnet, in a promiscuous mode, matching the traffic that is passed on the subnets to a library of known attacks included in IPS software 110, stored on persistent storage 108, or stored on a computer attached to network 120. In computer networking, an attack is any attempt to destroy, expose, alter, disable, steal or gain unauthorized access to or make unauthorized use of an asset. Once an attack is identified, or abnormal behavior is sensed, the alert can be sent to the administrator. In computer networking, promiscuous mode is a mode for a wired network controller or wireless network controller that causes the controller to pass all traffic it receives to the central processing unit (CPU) rather than passing only the frames that the controller is intended to receive. Promiscuous mode is normally used for packet sniffing and typically takes place on a router or on a computer connected to a hub (instead of a switch or one being part of a WLAN). In another embodiment, a host intrusion detection system (HIDS) may be used in place of IPS software 110. A HIDS monitors the inbound and outbound packets from the computer or server only and will alert the user or administrator if suspicious activity is detected.

Persistent storage 108 includes LKM 112. LKM 112 is used by server 102 and BMC 114 to modify the destination media access control (MAC) address of outbound packets destined to switch 118 or to server 122 if the host partition in not active on server 102. In computing, a loadable kernel module (or LKM) is an object file that contains code to extend the running kernel, or so-called base kernel, of an operating system. LKMs are typically used to add support for new hardware and/or filesystems, or for adding system calls. When the functionality provided by a LKM is no longer required, the LKM can be unloaded in order to free memory and other resources. A MAC address is a unique identifier assigned to network interfaces for communications on the physical network segment. In one embodiment, while the host partition on server 102 is active, LKM 112 is loaded as part of IPS software 110 or as an individually instantiated callable program. In other embodiments, any program, component, module, script, or binary may provide the same functions as LKM 112. For example, some embodiments include a non-LKM system, module, and/or component adapted to modify the destination MAC address of an outbound packet.

Server 102 includes BMC 114. A baseboard management controller (BMC) is a specialized service processor that monitors the physical state of a computer, network server, or other hardware device using sensors and communicating with the system administrator through an independent connection. The BMC is part of the intelligent platform management interface (IPMI) and is usually contained in the motherboard or main circuit board of the device to be monitored. IPMI is a set of computer interface specifications for an autonomous computer subsystem that provides management and monitoring capabilities independently of the host system's CPU, firmware (BIOS or UEFI) and operating system. Basic Input/Output System (BIOS), also known as the System BIOS, ROM BIOS or PC BIOS, is a type of firmware used during the booting process e.g., power-on startup, on IBM PC compatible computers. Unified extensible firmware interface (UEFI) is a standard firmware interface for PCs, designed to replace BIOS.

Server 102 also includes network controller 116. Network controller 116 is a computer hardware component that connects server 102 to network 120 via switch 118. Network controller 116 allows server 102 to communicate with BMC 114, switch 118, server 122, and computer 136. Network controller 116 also includes a filter tag logic which allows the adapter to determine how to route the incoming packets. To do this, the filter tag logic in network controller 116 looks for a special tag (sometimes also referred to as a "filter tag", "tag", and/or a "special filter tag") in incoming packets. If the incoming packets contain the special tag (indicating the packet is destined for BMC 114), network controller 116 routes them to BMC 114 to be processed. The components of network controller 116 are described in further detail with respect to FIG. 3.

In FIG. 1, network 120 is shown as the interconnecting fabric between server 102, server 122, and computer 136. In practice, the connection may be any viable data transport network, such as, for example, a LAN or WAN. Network 120 can be, for example, a local area network (LAN), a wide area network (WAN) such as the Internet, or a combination of the two, and include wired, wireless, or fiber optic connections. In general, network 120 can be any combination of connections and protocols that will support communications between server 102, server 122, and computer 136 in accordance with a desired embodiment of the invention.

Distributed data processing environment 100 includes server 122. Server 122 includes RAM 124, central processing unit 126, persistent storage 128, and network controller 134. Intrusion protection system (IPS) software 130 and loadable kernel module (LKM) 132 are stored in persistent storage 128, which also includes operating system software, as well as, software that enables server 122 to communicate with switch 118, server 102, and computer 136 over a data connection on network 120. In one embodiment, IPS software 130 may execute on server 122 during runtime, when the host partition on server 102 is not active, and monitor all traffic to BMC 114 from all devices on the network. IPS software 130 analyzes the incoming packets to prevent hacking or denial of service attacks on BMC 114. In other embodiments, IPS software 130 may perform an analysis of passing traffic on the entire subnet, in a promiscuous mode, matching the traffic that is passed on the subnets to a library of known attacks. Once an attack is identified, or abnormal behavior is sensed, the alert can be sent to the administrator. In other embodiments, a host intrusion detection system (HIDS) or a network intrusion protection system may be used in place of IPS software 130.

In one embodiment of the present invention, server 122 may be a dedicated system executing IPS software 130 and loadable kernel module (LKM) 132, serving as a backup in the event that server 102 is powered off or terminates unexpectedly. LKM 132 is used to modify the destination MAC address of the outgoing packets destined to BMC 114. In other embodiments, server 122 may be the primary system used to detect network intrusions or denial of service attacks on BMC 114.

Distributed data processing environment 100 includes computer 136. In the example embodiment of the present invention, computer 136 is a device attached to network 120 and capable of communicating with server 102, switch 118, and server 122. Computer 136 contains RAM 138, central processing unit 140, and persistent storage 142. Persistent storage 142 may, for example, be a hard disk drive. Alternatively, or in addition to a magnetic hard disk drive, persistent storage 142 may include a solid state hard drive, a semiconductor storage device, read-only memory (ROM), erasable programmable read-only memory (EPROM), flash memory, or any other computer-readable storage medium that is capable of storing program instructions or digital information. Operating system software 144 is stored in persistent storage 142 that enables computer 136 to communicate with server 102, switch 118, and server 122 over a data connection on network 120.

Distributed data processing environment 100 includes switch 118. In the example embodiment of the present invention, switch 118 is a computer networking device that uses packet switching to receive, process, and/or forward data to server 102 from other devices on network 120. In other embodiments, any computer networking device capable of sending packets over a network may be used to perform the functions of switch 118. Examples of other computer networking devices (also referred to as network equipment, or network hardware) are gateways, routers, bridges, and hubs. Computer networking devices also include, but are not limited to, hybrid network devices such as multilayer switches, protocol converters, bridge routers, proxy servers, firewalls, network address translators, multiplexers, wireless access points, and other related hardware.

Figure 2:
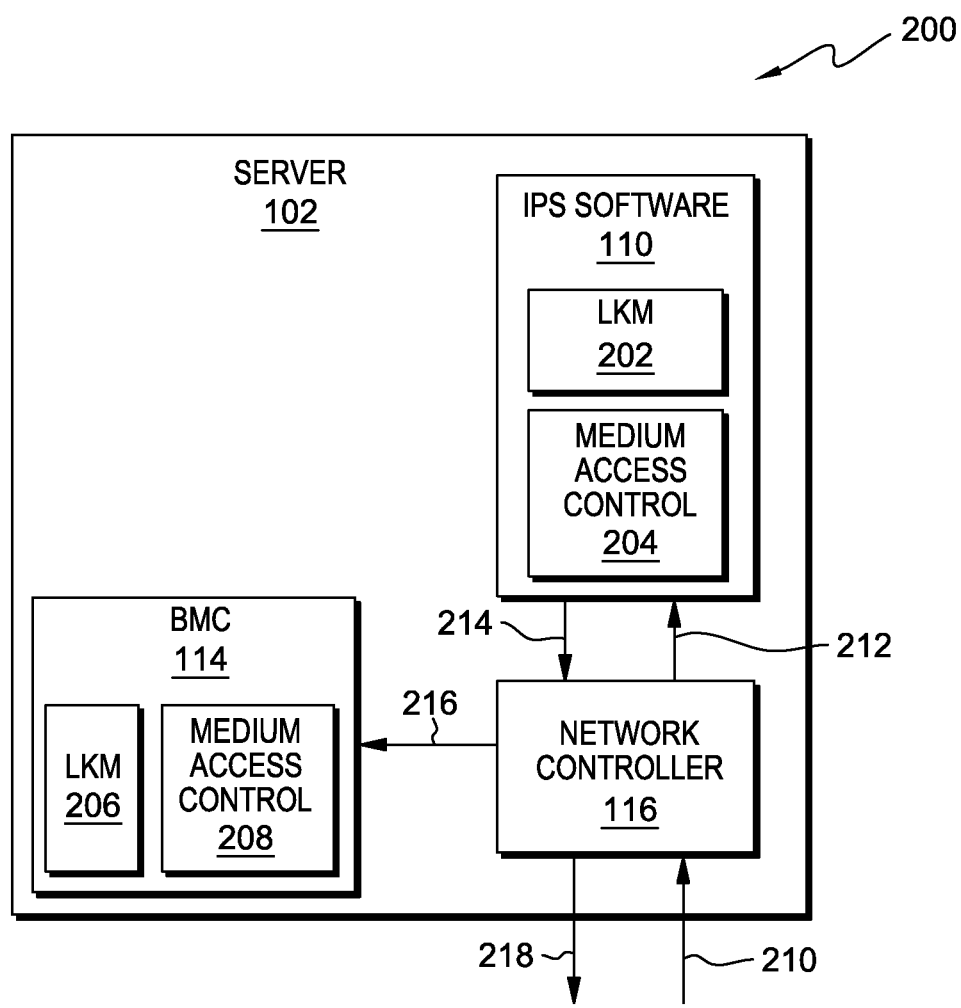
FIG. 2 is a functional block diagram illustrating the flow of data between a network controller, a base management controller, and intrusion prevention system software, in an embodiment in accordance with the present invention.

FIG. 2 is a functional block diagram, generally designated 200, illustrating the flow of data between the network controller, base management controller, and intrusion prevention system software, in an embodiment in accordance with the present invention. Server 102 contains IPS software 110, BMC 114, and network controller 116. IPS software 110 includes LKM 202 and medium access control 204. In the seven-layer open systems interconnection (OSI) model of computer networking, the media access control data communication protocol is a sub-layer of the data link layer (layer 2). The OSI model is a conceptual model that characterizes and standardizes the internal functions of a communication system by partitioning it into abstraction layers. The MAC sub-layer provides addressing and channel access control mechanisms that make it possible for several terminals or network nodes to communicate within a multiple access network that incorporates a shared medium, e.g., Ethernet. BMC 114 also includes LKM 206 and a medium access control 208. LKM 202 and LKM 206 are both instantiated during startup or boot time. LKM 202 in IPS software 110 is used when the local host is active while LKM 206 is used when BMC is notified or detects the local host partition is no longer active or reachable.

Network controller 116 receives all data destined to BMC 114 and the host partition on server 102 as depicted by data path indicator 210. Packets designated with a special tag are sent to medium access control 208 (as depicted by data path indicator 216) to be processed by BMC 114. All other packets are sent to the host partition using medium access control 204 (as depicted by data path indicator 212) to be inspected by IPS software 110. IPS software 110 then inspects the packet to decide whether to discard the packet or forward the packet to BMC 114. In other embodiments, IPS software 110 may be configured to only monitor traffic destined to BMC 114. In other embodiments, IPS software 110, may be configured to monitor all traffic destined for both BMC 114 and the local host on server 102.

When a packet is determined to be destined for BMC 114, LKM 202 modifies the packet's destination MAC address to be the same as BMC 114's MAC address and marks the packet with a special tag to indicate the packet should be delivered to BMC 114. The packet is then passed to network controller 116 using medium access control 204 as depicted by data path indicator 214, and then transmitted to switch 118 (see FIG. 1) as depicted by data path indicator 218. Switch 118 looks up the destination MAC address, determines the packet is for BMC 114, and transmits the packet to network controller 116 as depicted by data path indicator 210. Network controller 116 receives the packet, filters the special tag, and transmits the packet to BMC 114 through a network controller side band interface (NC-SI) and medium access control 208 as depicted by data path indicator 216. In other embodiments, the packet may be transmitted directly to BMC 114 through network controller 116 rather than to switch 118 first. The NC-SI is described in further detail with respect to FIG. 3.

Figure 3:
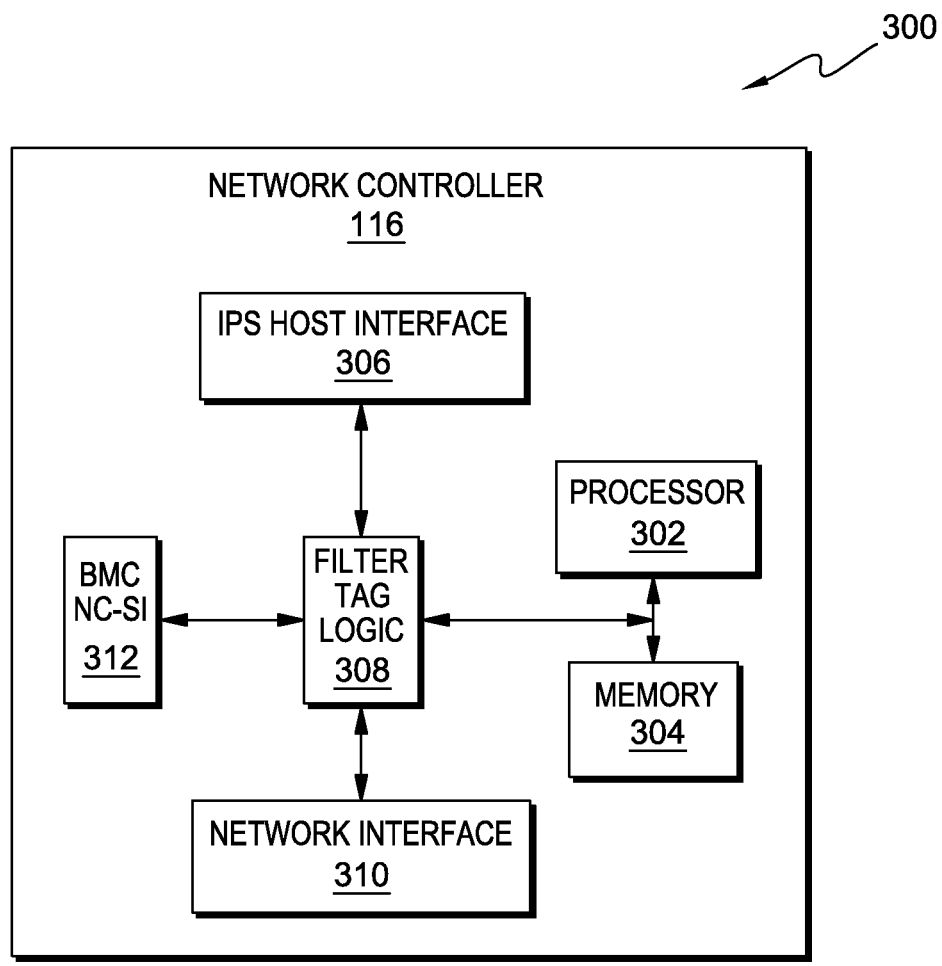
FIG. 3 is a functional block diagram illustrating a packet filtering logic in the network hardware within the distributed data processing environment of FIG. 1, in an embodiment in accordance with the present invention.

FIG. 3 is a functional block diagram, generally designated 300, illustrating a packet filtering logic in the network hardware within the distributed data processing environment of FIG. 1, in an embodiment in accordance with the present invention. Network controller 116 contains processor 302, memory 304, IPS host interface 306, filter tag logic 308, network interface 310, and BMC side band interface (NC-SI) 312. It should be appreciated that FIG. 3 provides only an illustration of one implementation and does not imply any limitations with regard to the environments in which different embodiments may be implemented. Many modifications to the depicted environment may be made. In one embodiment, filter tag logic 308 may reside in memory 304 or in a separate read-only memory (ROM), erasable programmable read-only memory (EPROM), or flash memory. In another embodiment, filter tag logic 308 may reside on the host server and is downloaded to network controller 116. Filter tag logic 308 may be implemented in multiple ways. In one embodiment, filter tag logic 308 may leverage existing attributes in the packet or manually modify the packet content (i.e., payload) to add additional information, such as the special tag. In another embodiment, filter tag logic 308 may leverage existing packet attributes such as by using a VLAN tag, the identification field in the IP header and/or the IP option field in the IP header. In other embodiments, filter tag logic 308 may modify the packet content including modifying the payload and recalculating the checksum of the packet.

The verification of tags in received packets depends on the packet tagging mechanism implemented. Network controller 116 uses the corresponding mechanism to verify the packet tag. In one embodiment, the packet tagging mechanism may be pre-configured using shared policy between sender and receiver. In another embodiment, one or both sides may negotiate the tagging mechanism before transmitting the first packet. For example, if the sending computer chooses to use VLAN as the tagging mechanism, e.g., each packet the computer transmits will have VLAN set to 123, the receiver would check if the incoming packet has VLAN 123 to verify it. However, in many embodiments preventing forged tags has two necessary steps. First, there should be a shared secret between sender and receiver. Second, both the sender and the receiver use the shared secret to construct a trustworthy authenticator/token which will be considered as part of the tag attached in the packet. For example, in one embodiment the sender generates a unique tag for each packet by calculating the checksum of the packet with a shared key. The receiver then uses the same mechanism to verify the packet tag. Without the proper shared key, a hacker cannot forge the valid packet tag.

IPS host interface 306 is included in network controller 116. IPS host interface is used to send packets between IPS software 110 on the host partition of server 102 and network controller 116. Filter tag logic 308 enables network controller 116 to quickly determine if a received packet should be routed to BMC 114 through the BMC side band interface (NC-SI) 312. NC-SI is an electrical interface and protocol which enables the connection of a BMC to a set of network interface controller (NICs) in server computer systems for the purpose of enabling out-of-band remote manageability. In other embodiments, network controller 116 may transmit the packet to BMC 114 using a management component transport protocol (MCTP). MCTP is a protocol designed to support communications between different intelligent hardware components that make up a platform management subsystem, providing monitoring and control functions inside a managed computer system.

Figure 4:
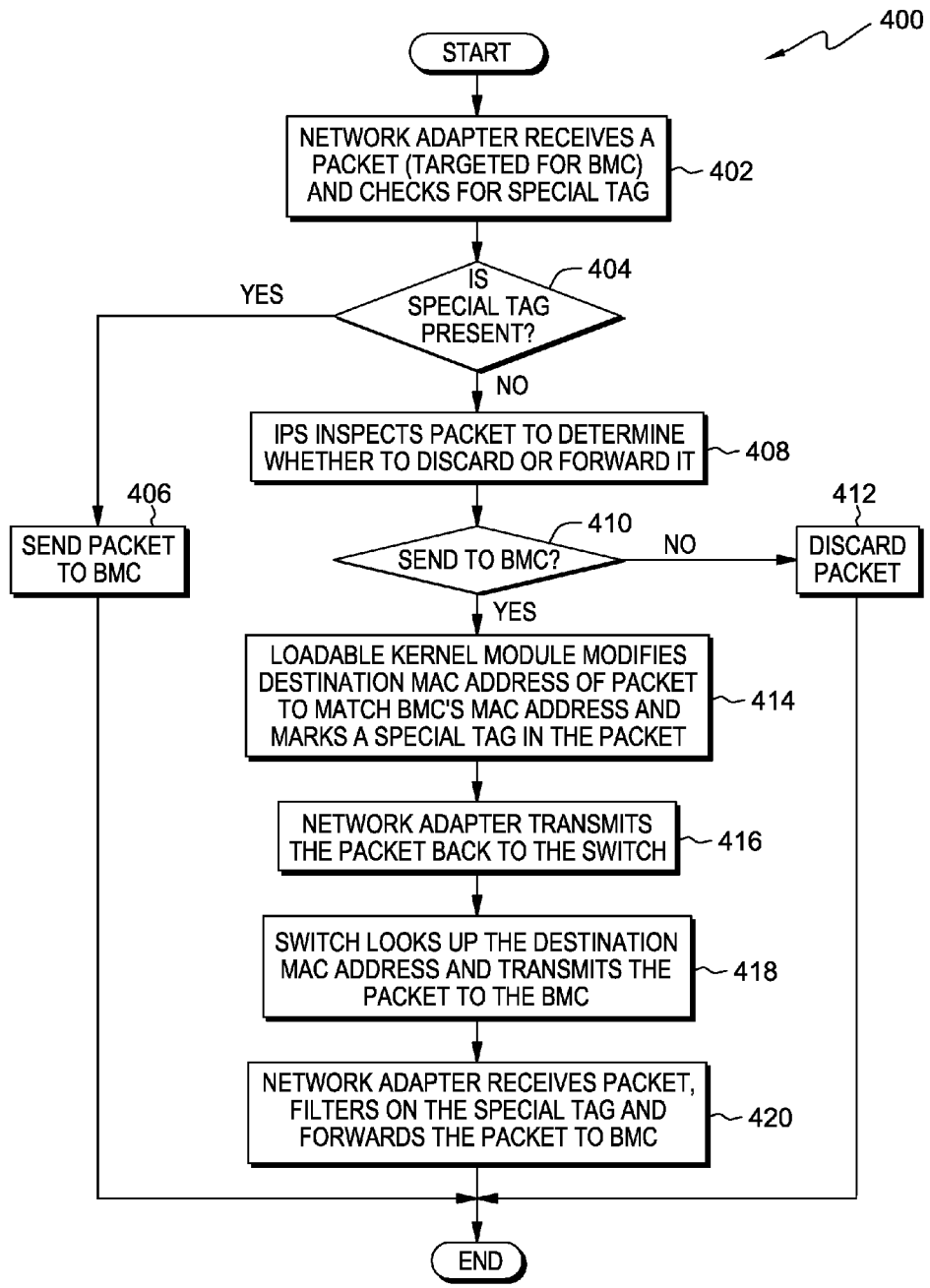
FIG. 4 is a flowchart depicting operational steps of an intrusion prevention system for the base management controller, on a server computer within the data processing environment of FIG. 1, in an embodiment in accordance with the present invention.

FIG. 4 is a flowchart, generally designated 400, depicting operational steps of an intrusion prevention system for the base management controller, on a server computer within the data processing environment of FIG. 1, in an embodiment in accordance with the present invention. Network controller 116 receives a packet, destined for BMC 114, from server 122 or computer 136, through switch 118, on network 120 and filters on the special tag as depicted in step 402. In decision step 404, network controller 116 checks to see if the packet is marked with the special tag. If the special tag is present ("yes" branch, decision 404), then network controller 116 transmits the packet to BMC 114 for processing through the network controller BMC side band interface (NC-SI) 312 as depicted in step 406. If the special tag is not present, ("no" branch, decision 404), then network controller 116 sends the packet to the host partition on server 102. In step 408, IPS software 110 inspects the packet to determine whether to discard or forward the packet to the host partition on server 102 or BMC 114. In some embodiments, this inspection includes examining network traffic to detect and prevent vulnerability exploits. Any packet determined to be unsafe is discarded by IPS software 110. In one embodiment, packets determined to be safe are forwarded to the host partition on server 102 or to BMC 114 based on the packet's destination MAC address. In other embodiments, the packet's destination IP address and/or the packet's destination MAC address may be used to determine whether to forward the packet to the local host partition or BMC 114. In decision step 410, IPS software 110 determines whether the packet destination MAC address is for BMC 114. If the destination MAC address is not for BMC 114 ("no" branch, decision 410), then IPS software 110 discards the packet as depicted in step 412. If the packet destination is BMC 114 ("yes" branch, decision 410), then LKM 112 modifies the packet's destination MAC address to BMC 114 MAC address and sets the special tag in the packet as depicted in step 414. The special tag indicator is used to indicate to network controller 116 the packet is safe and destined for BMC 114. In one embodiment, the special tag indicator may be contained in the IP header of the packet. In other embodiments, the special tag indicator may be contained in a secondary header or in the packet payload. Network controller 116 then transmits the packet to switch 118 as depicted in step 416. Switch 118 receives the packet and determines the destination MAC address is that of BMC 114, then transmits the packet back to network controller 116 as depicted in step 418. In step 420, network controller 116 receives the packet and filter logic 308 checks for the special tag. Once filter tag logic 308 determines the packet is for BMC 114, network controller 116 routes the packet to BMC 114 through the network controller BMC side band interface (NC-SI) 312. BMC 114 receives and processes the packet.

Figure 5A:
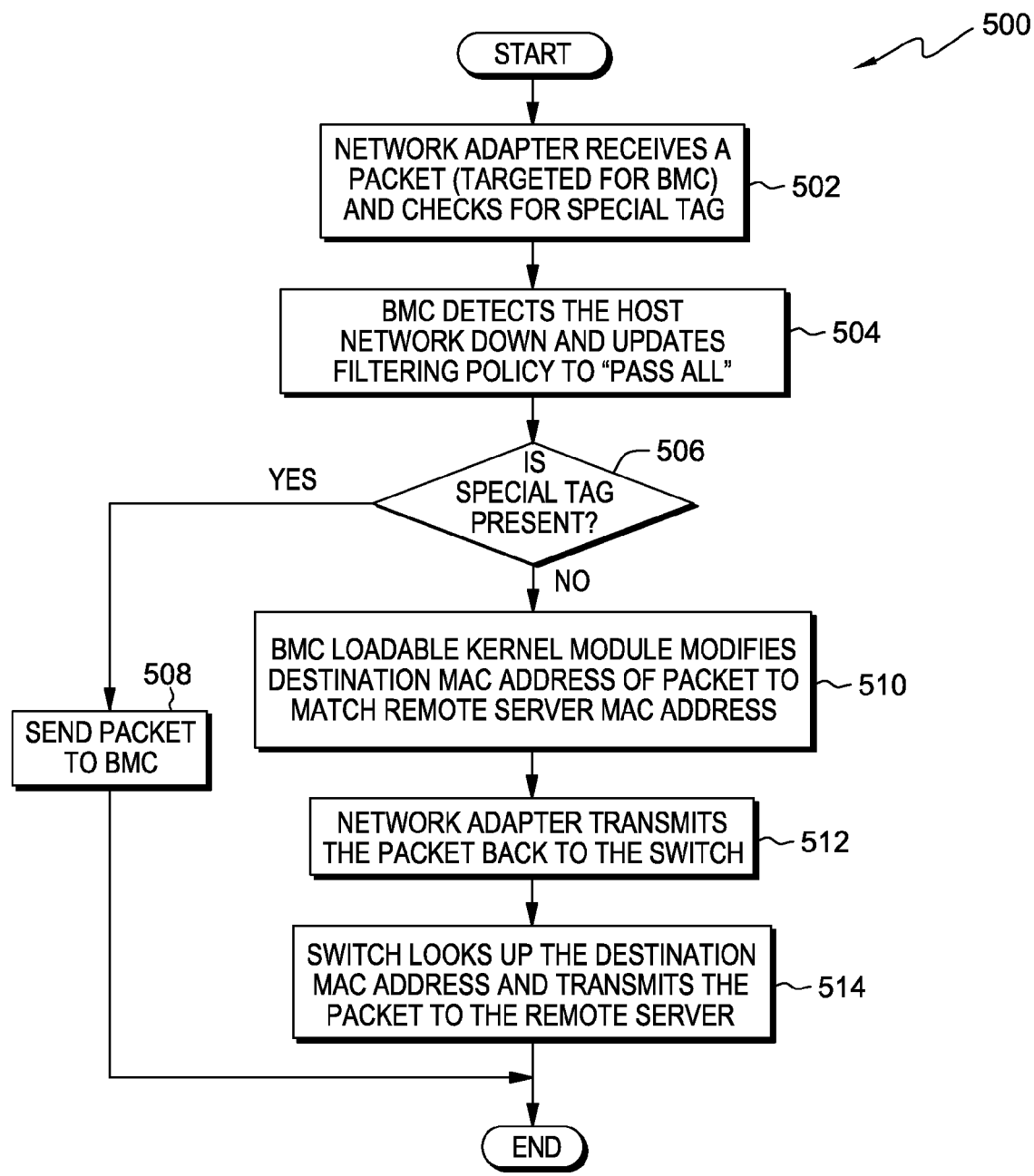
FIG. 5a is a flowchart depicting operational steps of an intrusion prevention system for the base management controller, on a server computer with an inactive host, within the data processing environment of FIG. 1, in an embodiment in accordance with the present invention.
Figure 5B:
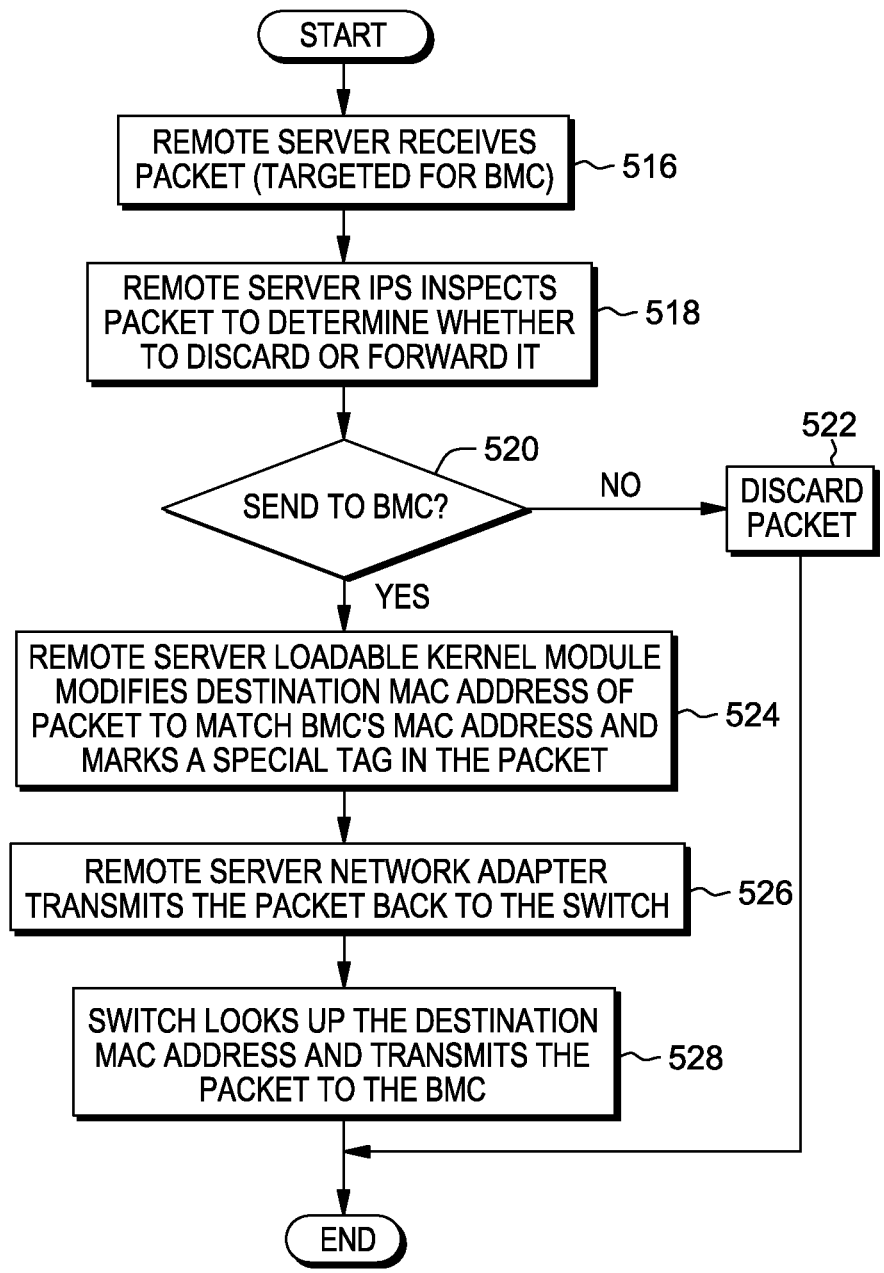
FIG. 5b is a flowchart depicting operational steps of a remote server computer performing the intrusion prevention system operations for the base management controller on the server computer with the inactive host, within the data processing environment of FIG. 1, in an embodiment in accordance with the present invention.
Figure 5C:
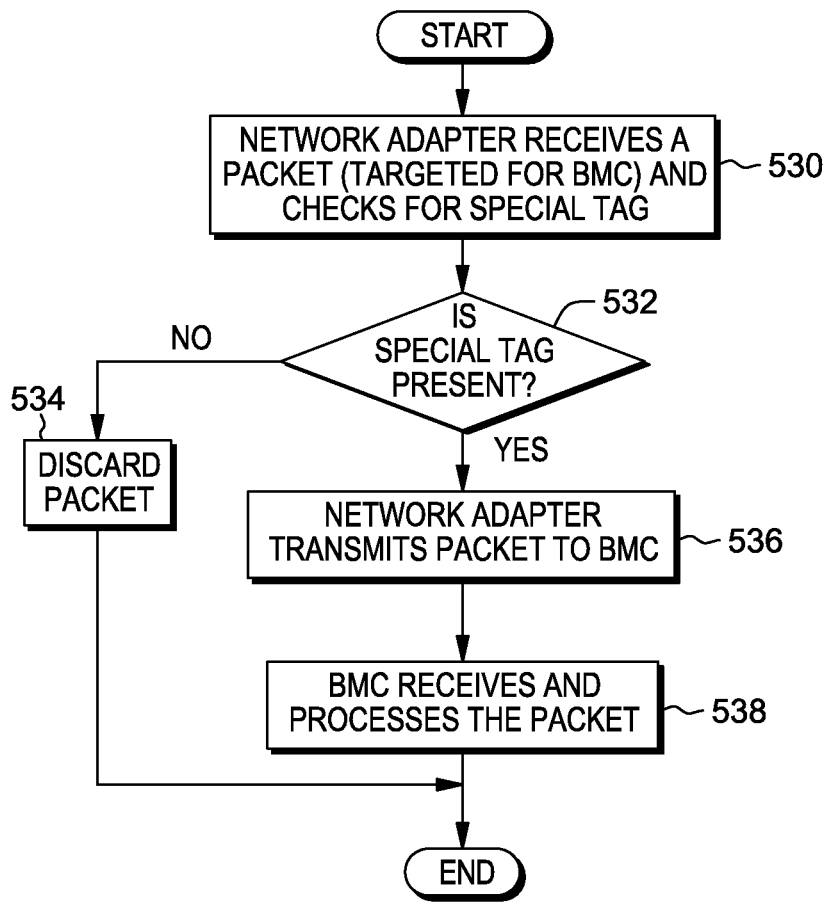
FIG. 5c is a flowchart depicting operational steps of the network controller accepting verified traffic from the intrusion prevention system on the remote server computer and sending the traffic to the base management controller, within the data processing environment of FIG. 1, in an embodiment in accordance with the present invention.

FIGS. 5a, 5b, and 5c depict interacting processes in an embodiment according to the present invention. More specifically, FIGS. 5a, 5b, and 5c depict an embodiment where a server computer has an inactive host, such that IPS software on the server computer is unavailable. FIG. 5a is a flowchart, generally designated 500, depicting the operational steps of the intrusion prevention system for the base management controller, on the server computer with the inactive host, within the data processing environment of FIG. 1. Network controller 116 receives a packet, destined for BMC 114, from server 122 or computer 136, through switch 118, on network 120 and filters on the special tag as depicted in step 502. In step 504, BMC 114 is notified, or detects, that the host network or partition is down. As a result, BMC 114 updates the filtering policy in network controller 116 to "PASS ALL". In an alternate embodiment, BMC 114 may update the filtering policy in network controller 116 to "PASS ALL" and then activate or instantiate LKM 112 in the BMC memory space. In decision step 506, network controller 116 checks to see if the packet is marked with the special tag. If the special tag is present ("yes" branch, decision 506), then network controller 116 transmits the packet to BMC 114 for processing through the network controller BMC side band interface (NC-SI) 312 as depicted in step 508. Received packets that do not have a special tag are then sent to remote server 122 (also sometimes referred to as a "remote host") to be inspected by IPS for potential hacking or denial of service attacks on BMC 114 on server 102. If the special tag is not present, ("no" branch, decision 506), then BMC 114 LKM 206 modifies the packet's destination MAC address to be the same as remoter server 122's MAC address, as depicted in step 510. Network controller 116 then transmits the packet to switch 118 as depicted in step 512. In step 514, switch 118 receives the packet, determines the destination MAC address is that of remote server 122, and then transmits the packet back to network controller 134.

FIG. 5b is a flowchart depicting the operational steps of a remote server computer performing the intrusion prevention system operations for the base management controller on the server computer with the inactive host, within the data processing environment of FIG. 1, in an embodiment in accordance with the present invention. Network controller 134 on remote server 122 receives the packet, destined for BMC 114, from switch 118, transmitted from network controller 118 on server 102 with an inactive host partition as depicted in step 516. In step 518, IPS software 130, on remoter server 122 inspects the packet to determine whether to discard or forward the packet to the local host partition on server 122 or to BMC 114. In decision step 520, IPS software 130 checks to see if the packet should be forwarded to the host partition on server 122. If the packet destination is not BMC 114 ("no" branch, decision 520), then IPS software 130 discards the packet as depicted in step 522. If the packet destination is for BMC 114 ("yes" branch, decision 520), then LKM 132 modifies the packets destination MAC address to BMC 114 MAC address and sets the special tag in the packet as depicted in step 524. Network controller 134 then transmits the packet to switch 118 as depicted in step 526. Switch 118 receives the packet and determines the destination MAC address is that of BMC 114, then transmits the packet back to network controller 116 as depicted in step 528.

FIG. 5c is a flowchart depicting the operational steps of the network controller accepting verified traffic from the intrusion prevention system on the remote server computer and sending the traffic to the base management controller, within the data processing environment of FIG. 1, in an embodiment in accordance with the present invention. Network controller 116 receives a packet, destined for BMC 114, from switch 118, and filter logic 310 checks for the special tag as depicted in step 530. In decision step 532, network controller 116 checks to see if the packet is marked with the special tag. If the special tag is present ("yes" branch, decision 532), then network controller 116 transmits the packet to BMC 114 for processing through the network controller BMC side band interface (NC-SI) 312 as depicted in step 536. If the special tag is not present, ("no" branch, decision 532), then network controller 116 discards the packet as depicted in step 534. In step 538, BMC 114 receives and processes the packet.

Figure 6:
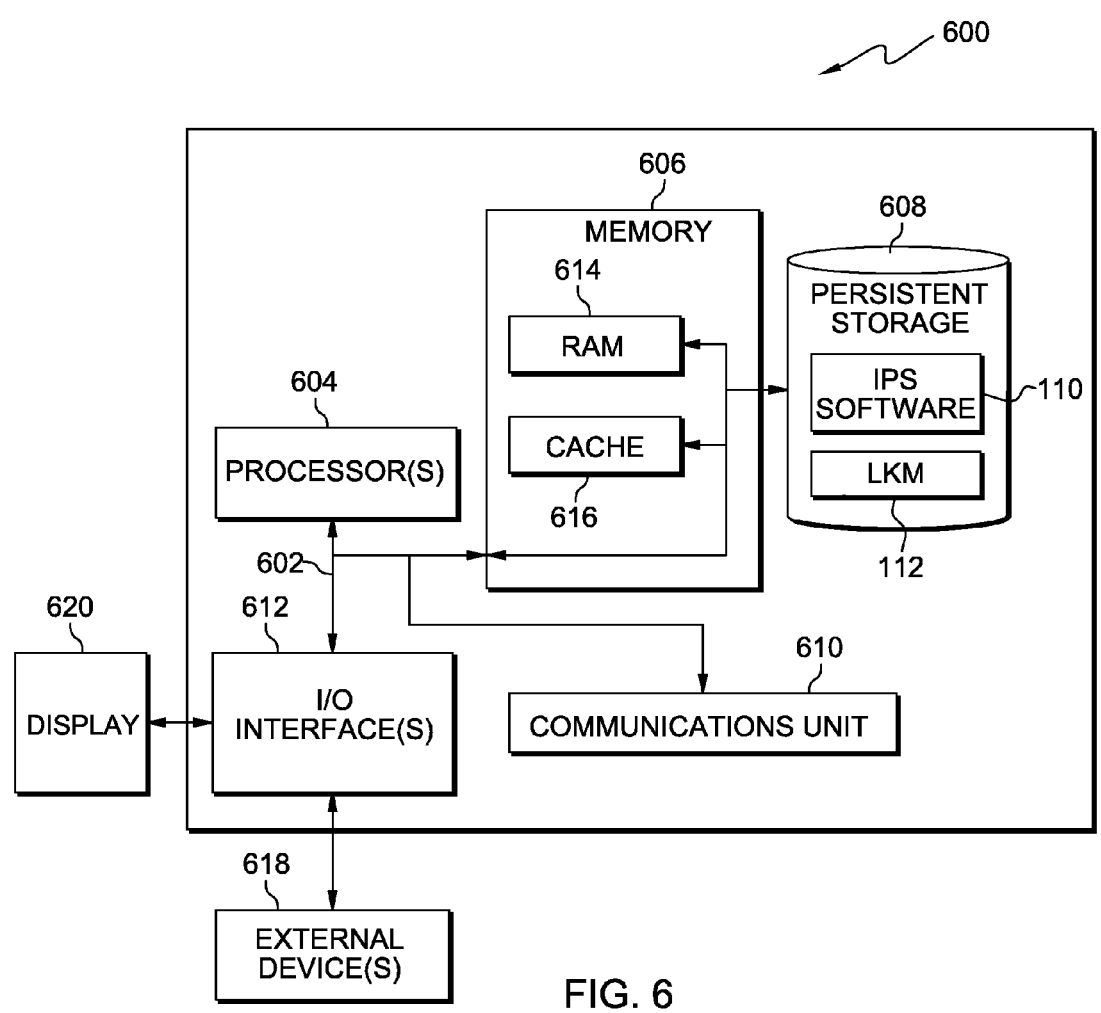
FIG. 6 depicts a block diagram of components of the server computer executing the intrusion prevention system for the base management controller, in an embodiment in accordance with the present invention.

FIG. 6 depicts a block diagram, generally designated 600, of components of the server computer executing the intrusion prevention system for the base management controller, in an embodiment in accordance with the present invention. It should be appreciated that FIG. 6 provides only an illustration of one implementation and does not imply any limitations with regard to the environments in which different embodiments may be implemented. Many modifications to the depicted environment may be made.

Server computer 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

IPS software 110 and LKM 112 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 120, switch 118, server 122, and computer 136. In these examples, communications unit 610 includes one or more network interface cards. Communications unit 610 may provide communications through the use of either or both physical and wireless communications links. IPS software 110 and LKM 112 may be downloaded to persistent storage 608 through communications unit 610.

I/O interface(s) 612 allows for input and output of data with other devices that may be connected to server computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., IPS software 110 and LKM 112, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer readable storage medium having program instructions embodied therewith, wherein the computer readable storage medium is not a transitory signal per se, the program instructions executable by a processor(s) set to cause the processor set to perform a method comprising:

receiving, by a network controller, a packet from a computer networking device on a computer network, where the packet is destined for a baseboard management controller (BMC);

determining, by the network controller, whether the packet contains a tag identifying that the packet has been determined to be free of suspicious or malicious traffic, wherein the tag is constructed using a secret key shared between the BMC and the computer networking device;

on condition that the packet has been determined to not contain the tag, sending the packet to a network inspection module, by the network controller, to be inspected for malicious traffic, wherein sending the packet to the network inspection module comprises:

determining whether a local host is available to inspect the packet for malicious traffic, upon determining that the local host is not available, instantiating a loadable kernel module (LKM) to modify the packet's destination MAC address to be the MAC address of a remote host, and transmitting the modified packet to the remote host; and on condition that the packet has been determined to contain the tag, sending the packet to the BMC by the network controller.

2. The computer program product of claim 1, wherein the inspection of the packet for malicious traffic by the network inspection module comprises:

examining the packet using an intrusion protection system;

determining, based, at least in part, on the examining, whether to block or allow the packet; and on condition that the packet has been determined to be allowed, modifying the packet's destination MAC address to be the MAC address of the BMC and marking the packet with a tag indicating the packet is free of malicious traffic.

3. The computer program product of claim 1, wherein the packet is sent to the BMC by the network controller using a side band interface.

4. A computer system comprising a processor(s) set and a computer readable storage medium having program instructions embodied therewith, wherein the computer readable storage medium is not a transitory signal per se, the program instructions executable by the processor set to cause the processor set to perform a method comprising:

receiving, by a network controller, a packet from a computer networking device on a computer network, where the packet is destined for a baseboard management controller (BMC);

determining, by the network controller, whether the packet contains a tag identifying that the packet has been determined to be free of malicious traffic, wherein the tag is constructed using a secret key shared between the BMC and the computer networking device;

on condition that the packet has been determined to not contain the tag, sending the packet to a network inspection module, by the network controller, to be inspected for malicious traffic, wherein sending the packet to the network inspection module comprises:

determining whether a local host is available to inspect the packet for malicious traffic, upon determining that the local host is not available, instantiating a loadable kernel module (LKM) to modify the packet's destination MAC address to be the MAC address of a remote host, and transmitting the modified packet to the remote host; and on condition that the packet has been determined to contain the tag, sending the packet to the BMC by the network controller using a side band interface.

5. The computer system of claim 4, wherein the inspection of the packet for malicious traffic by the network inspection module comprises:

examining the packet using an intrusion protection system;

determining, based, at least in part, on the examining, whether to block or allow the packet; and on condition that the packet has been determined to be allowed, modifying the packet's destination MAC address to be the MAC address of the BMC and marking the packet with a tag indicating the packet is free of malicious traffic.

6. The computer system of claim 4, wherein the packet is sent to the BMC by the network controller using a side band interface.

* * * * *